United States Patent [19]

Quinn

[11] 4,138,635
[45] Feb. 6, 1979

[54] ALTERNATING CURRENT GENERATOR USING LIGHT DEPENDENT RESISTOR

[75] Inventor: Halsey P. Quinn, Rancho Palos Verdes, Calif.

[73] Assignee: Xerox Corporation, Stamford, Conn.

[21] Appl. No.: 804,966

[22] Filed: Jun. 9, 1977

[51] Int. Cl.² ............................................. G05F 1/64
[52] U.S. Cl. .................................... 323/21; 307/311; 355/14
[58] Field of Search ........................... 323/21; 355/14; 307/311

[56] References Cited

U.S. PATENT DOCUMENTS

| 3,737,756 | 6/1973 | Hasley et al. ........................... 323/21 |
| 4,038,594 | 7/1977 | Quinn et al. ............................ 323/21 |

OTHER PUBLICATIONS

*IBM Tech. Disc. Bulletin*, vol. 17, No. 5, Oct. 1974, "Dark Voltage Control System," by Ernst, p. 1408.

*Primary Examiner*—Gerald Goldberg
*Attorney, Agent, or Firm*—Leonard Zalman; James J. Ralabate; Sheldon F. Raizes

[57] ABSTRACT

Parallel connections are provided from high voltage power supplies of opposite polarities through separate light dependent resistors to an electrical load. Separate light emitting diodes are associated with each of the light dependent resistors and are driven by a differential amplifier having one reference input and another input responsive to load current or voltage. The load current or voltage is regulated or programmed through a relatively low voltage power supply and a programmed or regulated amplifier which manipulates the illuminating effect of the light emitting diodes to vary the resistance of the light dependent resistors in a prescribed manner. This manipulation of the resistances imposed in the parallel power leads produces an alternating current across the load. The reference input to the differential amplifier is preferably adjustable. Operation of the device is particularly useful in imposing a desired alternating current frequency on the high voltage, low current power supply to corotrons in a xerographic reproduction device.

8 Claims, 5 Drawing Figures

ALTERNATING CURRENT GENERATOR USING LIGHT DEPENDENT RESISTOR

FIELD OF THE INVENTION

The present invention relates to the imposition of an alternating current frequency on high voltage power leads and has particular application to the controlled provision of alternating current to corotrons in a xerographic reproduction device.

BACKGROUND OF THE INVENTION

Conventional high voltage power systems in which alternating current is provided by means of a high voltage power transformer are severely limited in flexiblity of secondary outputs. When a plurality of secondaries are to be operated from a single transformer primary, a single alternating current frequency is produced at each of the secondaries. Conventional high voltage power transmission systems make no provision for the generation of a plurality of different alternating current frequencies from the different secondaries of a single transformer. Consequently, to achieve different alternating current frequencies to different parts of a system utilizing the high voltage power supply, separate frequency transformers are required. These transformers involve a great deal of expense, especially where a number of different high voltage alternating current frequencies are required within the system. Each different transformer thus produces a power output, separately regulated, and at a unique and predetermined frequency.

The use of power transistors to impress different alternating current frequencies on separate voltage taps from different secondaries of a single transformer have proven to be unsatisfactory. A power transistor in such an arrangement conducts current at intervals regulated by increases and decreases of voltage at the base of the transistor. However, to operate in this manner power transistors must be connected in series with the electrical loads to which alternating current is to be provided. Under such conditions, the power transistors tend to break down rapidly, especially at voltages in excess of two kilovolts. In xerographic reproduction devices, voltages of from two to six kilovolts are normally utilized to provide power to corotrons to set up electrostatic fields in connection with image reproduction processes.

It is an object of the present invention to provide an arrangement for impressing an alternating current of a selected frequency and waveform on secondary outputs of a high voltage transformer without incurring the disadvantages of prior systems. This is possible because the present invention interposes a light dependent resistor in series with the power leads to the load to which electric current is to be supplied. Such light dependent resistors unlike power transistors, are able to accomodate voltages of from two to six kilovolts without adverse effect.

A further object of the invention is to provide a system for producing an alternating current in a high voltage power supply in which the frequency generating components are electrically isolated from the high voltages to be transmitted to the electrical load. This feature of electrical isolation is a highly desireable characteristic achieved using the present invention, since the resistance in the series connections to the load are governed by the illuminating effect of light emitting diodes, which are in optical communication with the light dependent resistors, but in electrical isolation therefrom. Thus, a much wider range of frequency generating components, such as operational amplifiers including differential amplifier circuits, is available for use, since these components are not subject to the high voltages to be provided to the electrical load. The electrical isolation of the frequency generating components allows electrical components of a much finer degree of precision to be used to effectuate the provision of alternating current to the load than is possible using conventional devices coupled in the electrical power circuitry.

In a xerographic reproduction device having a high frequency, low current, high voltage alternating current power supply, where a significantly lower frequency is required at the load, the desired lower frequency can be derived by sensing voltage or current at the corotron plate or shield. The signal so derived can be used in conjunction with a reference signal to generate a desired lower frequency control signal. This control signal in turn is used to periodically actuate a light emitting diode to regulate the power output to the corotron wire through a light dependent resistor connected in series therewith in accordance with the desired frequency. For example, if the desired frequency is four hertz and the load is fed from a rectified and filtered 60 hertz power supply, the four hertz signal can be impressed upon the DC signal without noticeable distortion. By employing a programmable feedback circuit, electromagnetic frequency transformation is not required. Instead of a conventional transformer, the resistance of a controlled light dependent resistor is used to vary the voltage provided to the electrical load.

Control of the resistance of the light dependent resistors allows any wave shape of alternating current to be provided to the load. Also, any number of alternating current and direct current voltage levels and outputs can be produced from a single transformer and rectifier by separately programming the illumination of the several light dependent resistors operated in parallel from a single transformer.

As previously noted the present invention has particular utility in connection with xerographic reproduction devices. One form of the corotron of such device is shown in U.S. Pat. No. 2,836,725. In the corotron depicted therein, a conductive corona electrode is provided in the form of an elongated wire connected to a direct current power supply. The wire is partially surrounded by a grounded electrically conductive shield. The wire is used to produce an electrostatic charge on another circuit element called a plate, which usually takes the form of a rotatable drum in a xerographic reproduction device. The drum is spaced from the wire so that a clear pathway of electron flow is provided both between the wire and the shield and between the wire and the drum. A corona discharge current flows partially between the wire and the drum and partially between the wire and the shield. According to the present invention, an alternating current is developed to effectuate a cyclic potential variation of the wire with respect to the drum and to the shield. This alternating current may be derived from direct current voltages, such as are developed at the transformer secondaries and utilized in connection with a xerographic reproduction device.

An alternative form of corotron may be biased in a manner taught in U.S. Pat. No. 2,879,395. In this patent, an alternating current corona generating potential is applied to the corotron wire and a direct current potential is applied to the conductive shield partially surrounding the wire to regulate the flow of ions from the wire to the drum. Other corotron configurations also exist, but need not be described in detail as the present invention is applicable to virtually any such device which employs a high voltage power supply to the corotron elements.

DESCRIPTION OF THE EMBODIMENT

Figure 1:
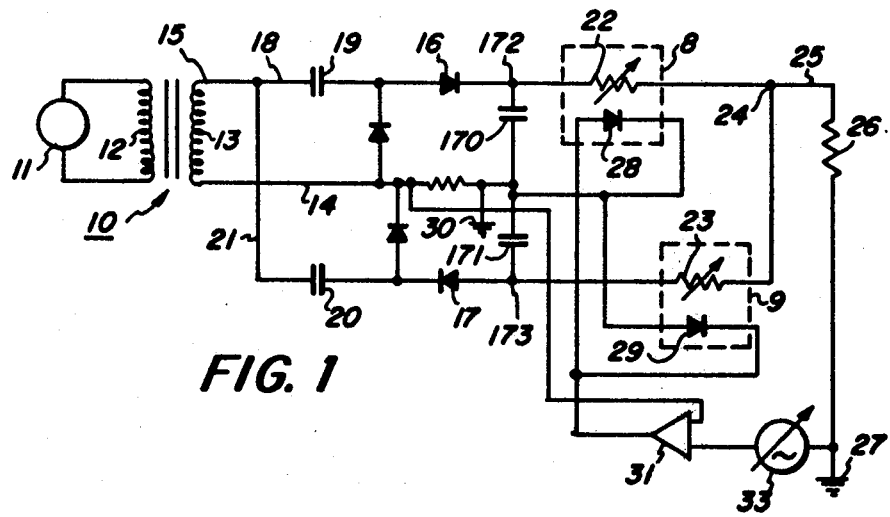
FIG. 1 depicts an embodiment of the invention in which an alternating current is produced and provided to a load according to the present invention.

Referring in particular to FIG. 1, there is depicted a system for impressing an alternating current on the output of a high voltage transformer 10. The transformer 10 is operated by an alternating current power source 11 which provides power to the primary 12 of the transformer 10. The power supply 11 effectuates the transmission of power to the transformer secondary 13 in a conventional manner. The lead 14 of the secondary 13 is grounded while the lead 15 alternatively supplies high voltage current of opposite polarity to the blocking diodes 16 and 17. Current is conducted to the blocking diode 16 on a lead 18 through a coupling capacitor 19. Current is conducted in the opposite direction from the blocking diode 17 through a coupling capacitor 20 to a lead 21 connected to the lead 15 of the secondary 13 of transformer 10.

Connected respectively to the blocking diode 16 and 17 are light dependent resistors 22 and 23 separately arranged in series with the DC outputs 172 and 173. The light dependent resistors 22 and 23 are connected together at a junction 24 from which a single lead 25 is connected to a load 26, and then to ground at 27. The light dependent resistors 22 and 23 may be made of a mixture of cadmium sulfide and cadmium selenide and suitable dopants such as copper chloride which is deposited on an insulating substrate along with two electrical connections. This assembly is sintered at a high temperature to form a multicrystal layer of welded crystals. The resistance of light dependent resistors manufactured in this fashion varies over a very wide range as a function of impinging light. Typical values for a device of one centimeter length and two centimeters width is $10^{11}$ ohms in the dark and $2 \times 10^4$ ohms when suitably illuminated.

Light emitting diodes 28 and 29 are arranged in optical communication respectively with light dependent resistors 22 and 23. While but a single light emitting diode is depicted in association with each light dependent resistor, preferably a bank of galium-arsenide light emitting diodes are placed in front of the associated light dependent resistor 22 or 23 so that the light from the diodes evenly illuminate the resistor material. The light dependent resistors and their associated light emitting diodes are enclosed in light resistant containers 8 and 9 to exclude ambient light. As the current through the light emitting diodes 28 and 29 is increased, the light increases, causing the resistivity of the resistance elements 22 and 23 to decrease.

With the types of materials mentioned above, the resistivity of the light dependent resistors 22 and 23 will change five orders of magnitude in approximately one-tenth second. This restricts the use of this device with those materials to relatively slow speed applications as far as changing of resistivity is concerned. This does not mean, however, that the resistance element cannot be used to control a high frequency AC or pulsed circuit. The element looks like a fixed resistance to these frequencies. However, preferably the light dependent resistors are formed from faster materials, such as silicon, to be useful as a commutating switch to generate alternating current from direct current sources. These light emitting diodes are grounded at 30 as indicated and are supplied with power through parallel connections from an operational amplifier 31 which cyclically actuates the light emitting diodes 28 and 29 in opposition with respect to each other and at a desired frequency to impose a frequency of alternation between conduction of power from each of the dual outputs 172 and 173. One of the inputs to the amplifier 31 is connected to the return lead 14 and serves as a current sensor while the other input is driven by a low voltage alternating source 33 which serves as a reference.

Figure 4:
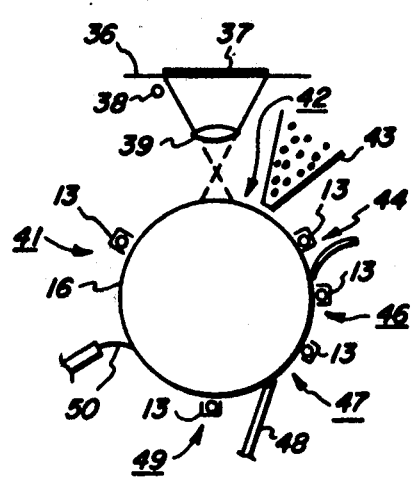
FIG. 4 illustrates diagramatically the function of corotrons in a xerographic reproduction device.
Figure 2:
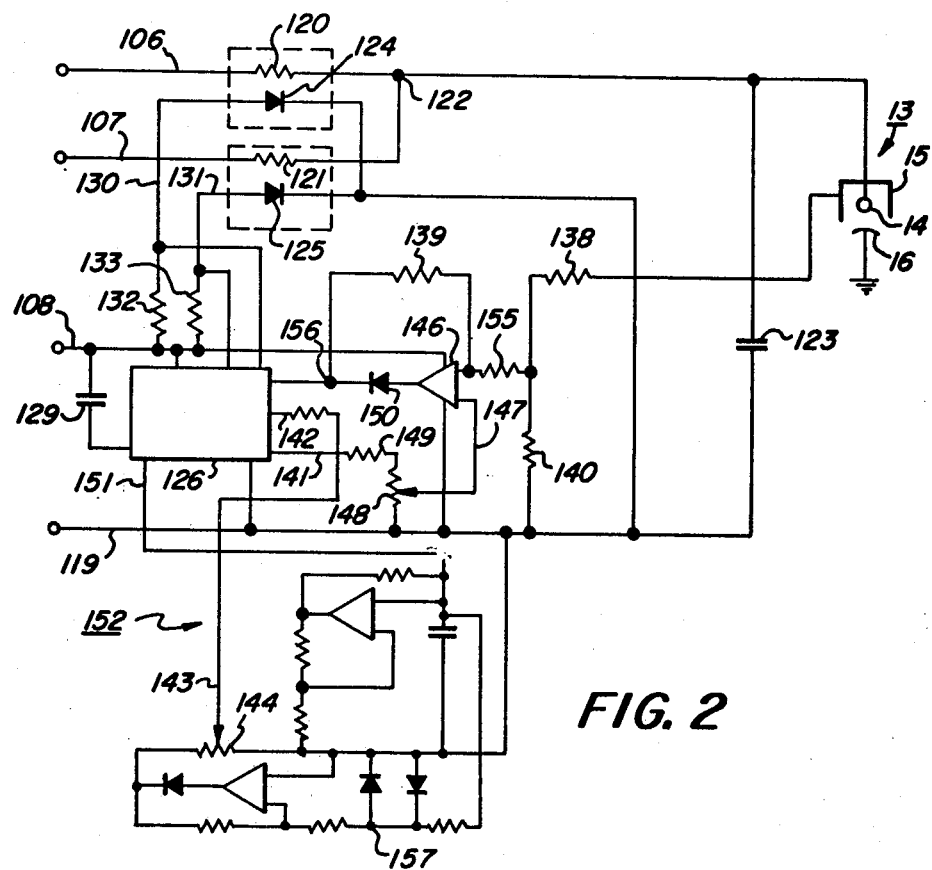
FIG. 2 depicts a variation of the embodiment of FIG. 1 as applied to a crotron in a xerographic reproduction device.

The load 26 may be any type of high voltage load, but a principal application is in providing alternating current to a corotron used in a xerographic reproduction device, such as the corotron 13 in FIG. 2. The structure of a corotron is depicted diagramatically in FIG. 2 and the operations of corotrons in a xerographic reproduction device are explained in connection with FIG. 4. With reference to FIG. 2, a corotron 13, includes a longitudinally extending corotron wire 14 partially surrounded but electrically insulated from a conductive shield 15. Spaced from the corotron wire 14 at a predetermined distance is corotron plate 16, which as previously noted, usually takes the form of a rotatable cylindrical drum in a xerographic reproduction device. With reference to FIG. 4, the function of a xerographic reproduction device may be explained to illustrate the manner of utilization of corotrons 13.

The plate 16 in FIG. 4 is a cylindrical drum, the outer surface of which is coated with a photoreceptive substance, such as a selenium compound. The drum 16 is positioned within a cabinet beneath the surface of a transparent glass viewing plate 36 upon which an original source document 37 to be reproduced is positioned. The source document 37 is laid face down on the plate 36 with the face to be reproduced directed toward the drum 16. A longitudinally extending fluorescent light bulb 38 is positioned perpendicular to the plane of FIG. 4 and to the side of a lens system 39 so as not to interfere with an image transmitted by the lens system 39 from the face of the document 37 to be reproduced onto the drum 16 of the xerographic imaging device. The fluorescent light 38 moves in sychronization with the clockwise rotation of the drum 16.

In an initial position of a cycle of operation, a corotron 13 at a charging station 41 is connected to a 6,000 volt direct current power supply which uniformly charges the portion of the surface of the drum 16 that moves past the wire of the corotron as the drum rotates. An area of the surface of the drum 16 is thereby charged to a potential of 700 volts. This charged area of the drum 16 is rotated into optical communication with the lens system 39, whereupon continued movement of the drum 16 is effectuated with synchronous movement of the tubular illuminating source 38. As the fluorescent light 38 moves from left to right in the plane of FIG. 4, an entire two dimensional image of the contents of the downward facing surface of the document 37 to be copied is transmitted as an image through the lens system 39 to the imaging station of the drum indicated at 42. At the imaging station 42, areas of the drum 16 are discharged locally to a level of approximately 200 volts in those specific locations at which light is reflected from the document 37 through the lens system 39. Where dark areas appear on the document, however, and the surface of the drum 16 is not directly illuminated through the lens system 39, the charge of 700 volts imparted at the charging station 41 remains. As a result, the portion of the drum 16 rotating past the imaging station 42 includes locally charged and partially discharged areas in a pattern corresponding to the image of the source document 37.

Once the drum 16 rotates the pattern of charged and partially discharged areas past the imaging station 42, these areas are brought adjacent to a longitudinally extending funnel 43. Minute particles of toner, typically carbon, are released from the funnel 43 onto the surface of the drum 16. At those locations at which the drum 16 is discharged by the receipt of reflected light, the toner particles do not adhere but instead glance off the surface of the drum 16 and fall into a recovery device for recycling. On the other hand, at those locations on the drum 16 at which light was not received, the drum remains locally charged to a level of 700 volts. This is a sufficient charge to cause the carbon particles to be attracted and to stick to the drum, even though the drum rotates to a degree where the toner particles would normally fall therefrom as a result of gravitational force.

The drum 16 continues its clockwise rotation until the electrically sensitized area reaches a corotron 13 at a pretransfer station 44. At the pretransfer station 44, the charge on the drum is scaled down to produce a zero voltage level at those locations on the drum surface at which light was received through the lens system 39, so that these locations are then totally discharged. The charge at the locations where light was not received is reduced accordingly to a level of 500 volts. The corotron 13 at the pretransfer station 44 receives a high voltage alternating current power supply that cycles the voltage potential of the corotron wire 14 relative to the drum 16 between plus 6000 and minus 5600 volts at a frequency of 400 hertz. This alternating current is generated by the embodiment of the invention depicted in FIG. 2 as will hereinafter be described.

As the drum 16 continues in its clockwise rotation, a sheet of paper, indicated at 45, is fed into position to tangentially contact the surface of the drum 16. The paper 45 tightly adheres to the surface of the drum 16 once contact is established by reason of the electrostatic charge remaining on the area not sensitized to light through the lens system 39. Continued clockwise rotation of the drum 16 brings the sheet of paper 45 and the charged areas of the drum 16 therebeneath into the proximity of another longitudinally extending corotron wire 13 at a transfer station 46. At the transfer station 46, the corotron wire is provided with a positive 6,000 voltage direct current power supply, which creates a higher charge on the paper than on the area of the drum 16 adjacent thereto. Thus, the toner particles are transferred from the surface of the drum 16 to the surface of the paper 45 in contact therewith and continue to adhere to the paper 45.

Further clockwise rotation of the drum 16 brings the paper 14 to a detack station 47 where the corotron 13 is maintained at a positive voltage potential relative to the drum 16. At the detack station 47, however, the DC voltage level produced at the corotron 13 is varied with a fixed AC voltage as the paper 45 with toner particles adhering thereto advances. A variable voltage, again produced in accordance with the present invention, is required at the detack station 47. This variable voltage is necessary because the leading edge of the paper 45 tends to adhere more tightly to the drum 16 then does the remaining portion of the paper 45 once the leading edge has been separated from the drum. Separation of the paper 45 from the drum 16 at the detack station is facilitated by the use of a blade 48 inclined at an angle with respect to the surface of the drum 16 and extending the width of the paper 45. The blade 48 lifts the paper 45 from the surface of the drum 16 as the drum 16 rotates. The paper 45 is then passed to a chemical or heat transfer station where the toner particles are permanently set on the paper. The paper 45 is afterwards passed to a static eliminator and then to a copy bin.

As the drum 16 continues to rotate, the image transfer area reaches a precleaning station 49 at which another corotron 13 is located. At the precleaning station 49 the corotron 13 is provided with an alternating current power supply according to the invention that varies between plus and minus 6,000 volts at a frequency of approximately 400 hertz. The corotron at the precleaning station 49 neutralizes the charge at the locations on the drum 16. A rubber squeegee 50 is positioned just past the precleaning station 49 to scrape any remaining toner particles from the surface of the drum 16. The surface of the drum 16 then continues to rotate in a clean condition and with no charge to the charging station 41, whereupon the entire process is repeated.

A complete explanation of the operation of the xerographic reproduction device is unnecessary for proposes of this invention, as the brief explanation provided herein is presented for the purpose of illustrating the various functional requirements that are demanded of the corotrons 13 and to illustrate the requirement for flexiblity in the provision of alternating current to the corotrons 13 that exist in a xerographic reproduction device.

Figure 3:
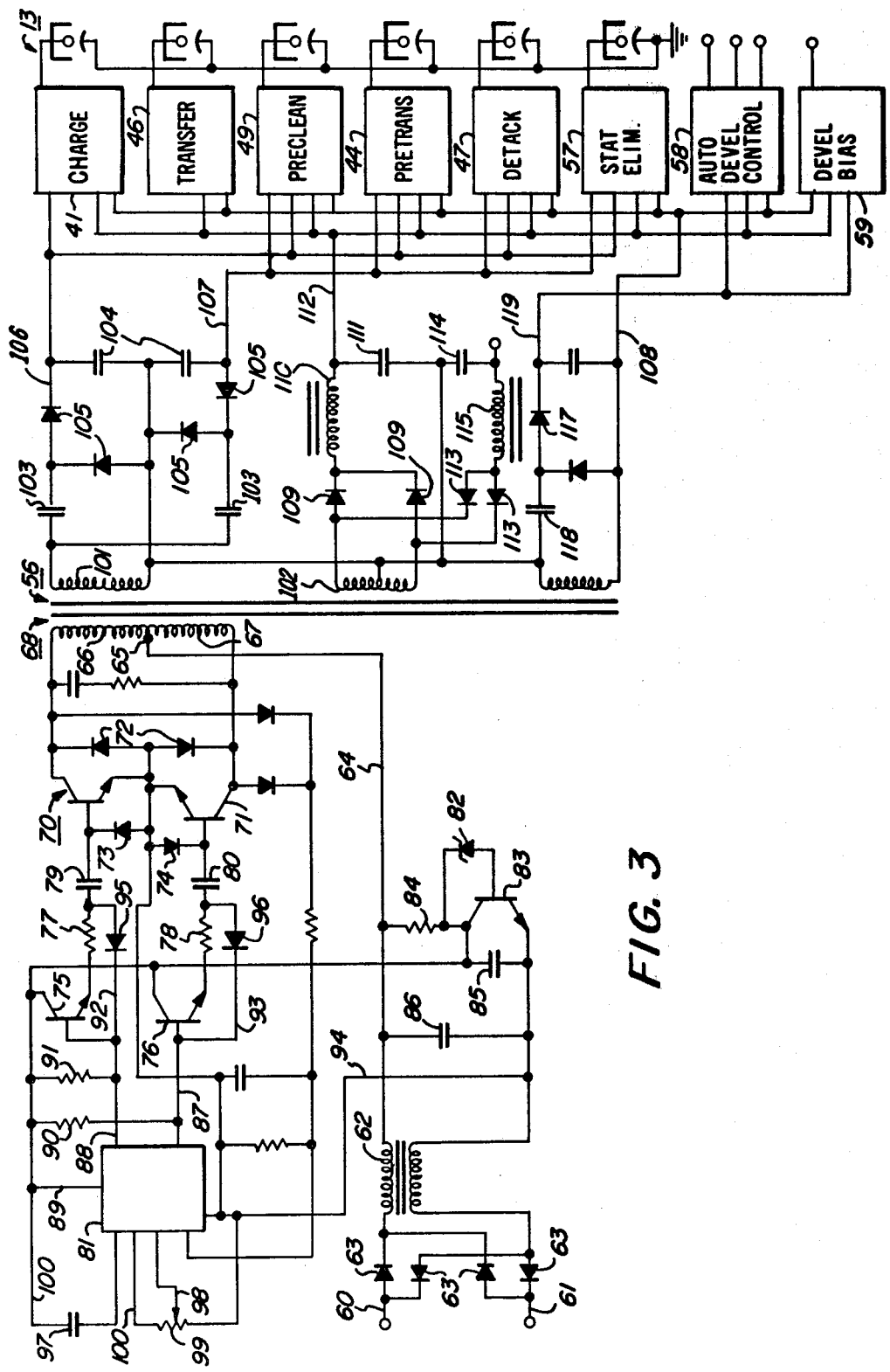
FIG. 3 depicts the power distribution arrangement in a xerographic reproduction device.

The distribution of high voltage power in xerographic reproduction devices is achieved through the circuitry of FIG. 3. Power is derived for all of the stations depicted in FIGS. 3 and 4 from a single transformer 56. The transformer 56, in addition to providing power to the various corotrons depicted in FIG. 4, also provides power to a static eliminator 57, which employs a very rudimentary form of corotron 13, and to an automatic developing control circuit 58 and to a developing bias circuit 59.

The input rectifier and main register control circuitry of FIG. 3 operates from a conventional 120 volt 60 cycle alternating line current which is received at leads 60 and 61. The alternating current is passed through rectifiers 63 and filter choke 62. The rectified output current is passed on lead 64 to the center tap 65 between portions 66 and 67 of the primary 68 of the high voltage transformer 56. The zener diode 82 and the transistor 83 connected across the leads 64 and 61 on the primary side of the transformer 56 act through a resistor 84 to provide a 14 volt power supply. A filtering capacitor 85 is connected across the collector and emitter of the transistor 83 and to the grounded power supply line 94 and to driver transistor 75 and 76. The return path of current through the primary halves 66 and 67 is through the power transistors 70 and 71. Diodes 72 are connected between the emitter and collector of each of the power transistors 70 and 71. Diodes 73 and 74 at the base emitter connections of transistors 70 and 71 are clamping diodes to limit the voltage to which the bases of the power transistors 70 and 71 can be dropped.

Power will be conducted through the primary 68 of the transformer 56 provided that the power transistors 70 and 71 are turned on. The power transistors 70 and 71 are controlled respectively by driver transistors 75 and 76. The driver transistors 75 and 76 act through the resistors 77 and 78 and capacitors 79 and 80 to forward bias the bases of the power transistors 70 and 71 when the driver transistors 75 and 76 conduct. Operation of the driver transistors 75 and 76 is controlled by a programmable regulator 81. The regulator 81 internally generates a pulse train which periodically removes a positive bias from the outputs 87 and 88. Between pulses generated within the programmable regulator 81, a positive bias is provided on the leads 87 and 88 which act though the resistors 90 and 91 to forward bias the driver transistors 75 and 76 respectively. However, during the existance of an internally generated pulse within the regulator 81, power is removed from leads 87 and 88 and the leads 92 and 93 are connected to the common grounded return 94 through the regulator 81. This causes the capacitors 79 and 80 to discharge through the diodes 95 and 96, thus removing the forward bias from the bases of the power transistors 70 and 71. When the power transistors 70 and 71 no longer conduct, current conduction through the primary 68 of the high voltage transformer 56 is abruptly terminated, and no further power is transmitted until termination of the internally generated pulse within the regulator 81.

The frequency of internal pulse generation within regulator 81 is determined by the rating of the capacitor 97 and the duration of each pulse generated is determined by adjustment of the wiper 98 along the potentiometer 99, the output of which is fed back to regulator 81 on lead 100. By adjustment of wiper 98 the internal pulse width generated by regulator 81 will be altered and transistors 75 and 76 will be turned on for a greater or lessor duration of the cycle frequency established by the capacitor 97. This adjustment in turn controls the amount of power transmitted by the transformer 56.

A plurality of secondary windings 101, 102 and 103 are provided for the single primary winding 68 of the high voltage transformer 56. Filtering capacitors 104, coupling capicators 103 and rectifiers 105 in conjunction with the secondary 101 of the transformer 56 provide a constant D.C. voltage level of plus 6,000 volts on the lead 106 and a minus 6,000 volts D.C. on the lead 107. The plus 6,000 voltage level is transmitted to all of the corotrons at each of the stations, but the minus 6,000 volts supply from the lead 107 is provided to only those corotron stations which are to receive an alternating current power supply. A common grounded connection 108 serves all of the corotron stations as indicated.

The secondary 102 of the high voltage power transformer 56 is connected to rectifiers 109 that rectify the transformer secondary output, an inductor 110 and smoothing capacitor 111 to produce a positive 15 volt supply on lead 112. Similarly, oppositely poled rectifiers 113, a capacitor 114, and another inductor 115 culminate in a negative 15 volt D.C. supply at 116.

The transformer secondary 103 is connected to rectifiers 117 and a coupling capacitor 118 to provide a 600 volt D.C. power supply on lead 119. This 600 volts supply is transmitted to an automatic developer control circuit 58 and to a developer bias circuit 59. The automatic developer control circuit 58 and developer bias circuit 59 do not terminate in corotrons, but instead are used to develop and control power supplies for various other internal functions of the xerographic reproduction device.

The high voltage alternating current power supply associated with the detack station 45, the pretransfer station 41, and the precleaning station 47 are derived from the positive and negative 6,000 volt direct current leads 106 and 107 of FIG. 3 in the manner depicted in FIG. 2. The alternating current generating circuitry of FIG. 2 includes separate light dependent resistors 120 and 121 connected in series with each of the D.C. power supplies 106 and 107 respectively. The outputs of the light dependent resistors 120 and 121 are joined at a junction 122 which is connected to the corotron wire 14. A filtering capacitor 123 removes the high frequency pulses and shapes the low frequency alternating current. Separate light emitting diodes 124 and 125 are respectively arranged in optical communication with the light dependent resistors 120 and 122. These light emitting diodes 124 and 125 are in electrical isolation from the light dependent resistors 120 and 121 with which they are associated. The light emitting diodes 124 and 125 are connected to outputs of a pulse width modulating signal generator 126. Unlike the light emitting diodes 22 and 23 of FIG. 1 which are operated in a linear mode, the light emitting diodes 124 and 125 are operated in the switched mode.

Figure 5:
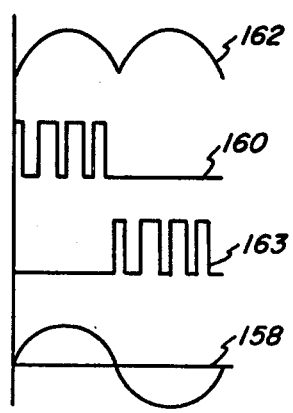
FIG. 5 depicts waveforms of power control and power response that may be produced in the device of FIG. 2.

The signal generator 126 emits two trains of rectangular pulses 160 and 163 on leads 130 and 131 respectively as indicated in FIG. 5. The pulses 160 and 163 occur at a constant frequency determined by the value of the capacitor 129 and are of variable pulse width as indicated in FIG. 5. It should be noted that the pulses 160 and 163 occur during opposite half cycles of the output frequency in opposition to each other. That is, the pulses 160 are of a maximum half cycle duration while the pulses 163 are limited in duration to the other half cycle. The pulses 160 and 163 do not appear at the light emitting diodes 124 and 125 simultaneously, but to the contrary occur in mutual opposition. The outputs 130 and 131 of the signal generator 126 are held at a voltage potential with respect to the low voltage pilot supply 108 by means of resistors 132 and 133 to maintain the amplitude of the pulses 160 and 163.

The signal generator 126 is powered by the 15 volt low voltage pilot supply 108. A feedback signal derived from the shield 15 is transmitted to the signal generator 126 through a voltage dividing network formed by the resistors 138 and 140 to compare the output of the shield 15 with a reference input to an operational amplifier 146.

The input at 151 controls a flip-flop in the pulse width modulating signal generator 126 which causes light dependent resistor 120 to be operable during the positive half cycle of the oscillator 152 and light dependent resistor 125 to be operable during the negative half cycle. Operational amplifier 146, which is part of the pulse width modulating signal generator 126 rectifies the alternating current signal appearing at the junction of resistors 138 and 140. A direct current signal from reference output 141 adjusted by potentiometer 148 through wiper arm 147 is applied to the other input of amplifier 146 to set the symmetry of rectification. The relative amplitude of positive and negative halves of the waveform determines the direct current component superimposed on the alternating current to bias the corotron 13. Oscillator 152 provides a full wave rectified sine wave at pot 144. Wiper arm 143 adjusts the level of this wave which is applied at 142 to signal generator 126. The output of amplifier 146 is input to the signal generator 126 at 156 where it is compared with the reference signal on 142. If the voltage at this junction is less than the reference, the pulses from the signal generator 126 are made wider to supply more current to light emitting diodes 124 and 125 and turn on the light dependent resistors for a larger percentage of time. This greater on time charges capacitor 123 up to a higher value.

In the operation of the circuit of FIG. 2 the pulses 160 and 163 of FIG. 5 appear respectively on the lines 130 and 131 to the light emitting diodes 124 and 125. The output pulses 160 and 163 which are transmitted to the light emitting diodes 124 and 125 respectively occur at a constant frequency which is established by the value of the capacitor 129. However, the pulses 160 and 163 are of a variable pulse width, as indicated in FIG. 5. Upon the occurrence of each pulse 160, the light emitting diode is illuminated, thereby decreasing the resistance of the resistor 120. A decrease in resistance of the light dependent resistor 120 tends to reduce the voltage drop from the positive 6,000 volt D.C. power supply line 106 at the light dependent resistor 120. At the same time, the absence of a pulse 163 means that the light emitting diode 125 is no longer illuminated. Consequently, the enclosure surrounding the light emitting diode 125 and the light dependent resistor 121 is darkened and the resistance of light dependent resistor 121 increases. A much larger voltage drop then occurs from the negative 6,000 volt power supply line 107 at the light dependent resistor 121 so that the summing node 122 is a strongly positive voltage.

The reference at 142 can be provided in any desired pattern. If the reference voltage at 142 takes the shape of full wave rectified sine wave, the output voltage from the operational amplifier 146 will follow and produce a full wave rectified sine wave output illustrated at 162 in FIG. 5. By virtue of the pulse width control, the pulse train 160 varies in width with amplitude of waveform 162 during the positive half cycle of operation. Similarly, the pulse train 163 to light emitting diode 125 varies with negative amplitude of waveform of the reference signal 126 during the negative half cycle. These pulse trains will adjust the instantaneous value of light dependent resistors 120 and 121 to produce a wave shape at summing node 122 which is nearly identical to the wave shape 158 at point 157 in oscillator 152.

In a typical application signals at 106 and 107 are generated by an inverter-transformer operating as in FIG. 3 above 20 KHz with positive and negative rectifierfilters to produce from 6KV to 10KV positive and from 6KV to 10KV negative. The ouput voltage to the corotron could be at any frequency up to about 10% of the chopping frequency in the pulse width modulating signal generator 126, or approximately 5 KHz. The wave shape of the output could be square, sine, triangle, sawtooth, etc. as determined by the reference at 147. The output to the corotron 13 in FIG. 2 is shown as voltage regulated, but it can be current regulated by sampling current instead of using the voltage divider formed by resistors 138 and 139.

The circuit of FIG. 1 operates in a manner similar to that of FIG. 2. However the operation of the circuit of FIG. 1 differs in that the signal generator 33 does not generate a squarewave pulse train, but rather generates a sinusoidal waveform directly. The sinusoidal waveform is referenced against a constant system ground at 30, and thus the resulting waveform appearing at the summing node 24 is likewise sinusoidal in configuration. In the circuit of FIG. 1, the alternating current source 11 may be used to provide a 25 kilohertz frequency across the transformer 10 coupled through the capacitors 19 and 20 and buffered through the capacitors 170 and 171. The voltages at junctions 172 and 173 respond much as would direct current levels to the low frequency alternating current generator 33.

While the alternating current generator 33 can impress an alternating current signal of any frequency on the voltage supply to the load 26, The structure of the light dependent resistors 22 and 23 is a limiting factor. As previously indicated, light dependent resistors formed of silicon have a quicker response than do light dependent resistors formed from cadmium sulfide and cadmium selenide.

Typically the response time for the light dependent resistors 22 and 23 is such that a maximum frequency that can be impressed on the power supply of FIG. 1 by the light dependent resistors 22 and 23 is 10 hertz when the light dependent resistors 22 and 23 are constructed of cadmium sulfide. Frequencies as high as 200 hertz can be employed where the light dependent resistors 22 and 23 are cadmium selenide while frequencies of up to 10 kilohertz can be impressed upon the load 26 when the light dependent resistors 22 and 23 are formed from silicon.

It is understood that the alternating current generating circuit depicted in FIG. 1 that is applied to the secondary of transformer 10 is but one of a number of different alternating current signal generating systems that can be employed in tandem to the secondary of transformer 10. Through different voltage taps to the secondary 13, different power leads can be connected to diverse loads, and alternating current frequencies can be selectively applied thereto and separately shaped and regulated. In this manner, multiple direct current and alternating current regulated outputs can be derived from one high frequency transformer rectifier, with resistors formed from cadmium sulfide and cadmium selenide.

Typically the response time for the light dependent resistors 22 and 23 is such that a maximum frequency that can be impressed on the power supply of FIG. 1 by the light dependent resistors 22 and 23 is 10 hertz when the light dependent resistors 22 and 23 are constructed of cadmium sulfide. Frequencies as high as 200 hertz can be employed where the light dependent resistors 22 and 23 are cadmium selenide while frequencies of up to 10 kilohertz can be impressed upon the load 26 when the light dependent resistors 22 and 23 are formed from silicon.

Various modifications and alterations of the embodiments of the present invention depicted herein will undoubtedly become readily apparent to those familiar with high voltage power transmission and alternating current generation. Accordingly, the scope of the invention should not be considered as limited to those specific embodiments disclosed herein, but rather is defined by the claims appended hereto.

I claim:

1. An electrical alternating current generator comprising
   a high voltage electrical power supply for supplying high voltage current of opposite polarities and having dual outputs connected to conduct electrical current in opposite directions with respect to a common ground,
   separate light dependent resistors arranged in series with each of said outputs and connected in circuit to an electrical load,
   separate light emitting means arranged in optical communication with separate ones of said light dependent resistors,
   differential amplifying means having one input from said load circuit,
   signal generating means for providing a low voltage reference signal as an input to said differential amplifying means, whereby said differential amplifying means acts through said light emitting diodes to cause the impedance of said light dependent resistor to conform thereto, thereby controlling the current supplied to said electrical load.

2. The electrical alternating current generator of claim 1 further characterized in that said signal generating means provides a low voltage reference signal of variable magnitude and polarity.

3. The electrical alternating current generator of claim 1 further characterized in that said signal generating means has outputs connected to each of said light emitting means that emit trains of square wave pulses at a constant frequency and of variable pulse widths as determined by said differential amplifying means for each of said two opposite polarities.

4. An electrical alternating current generator comprising
   a high voltage electrical power supply for alternatively supplying high voltage current of opposite polarities and having dual outputs connected to conduct electrical current in opposite directions with respect to an electrical load;
   separate light dependent resistors arranged in series with each of said outputs and connected to said electrical load,
   separate light emitting means arranged in optical communication with respective ones of said light dependent resistors,
   amplifying means operated by a low voltage pilot power supply and connected to both of said light emitting means to cyclically actuate said light emitting means at a desired frequency to impose a frequency of alternation between conduction of power from each of said dual outputs of said high voltage electrical power supply.

5. The electrical alternating current generator of claim 4 further characterized in that said amplifying means generates two pulse trains during opposite halves of a predetermined frequency cycle of fixed frequency and variable pulse width, and each of said pulse trains is transmitted to a separate one of said light emitting means and the pulse width of each pulse train is modulated cyclically to vary the duration of illumination by each of said light emitting means to provide an alternating current to said load.

6. The electrical alternating current generator of claim 5 further characterized in that said pulse width is varied sinusoidally with time to produce a sinusoidal power output to said load.

7. The electrical alternating current generator of claim 5 further characterized in that said pulse width is cyclically varied between two different widths to produce a square wave power outputs to said load.

8. A high voltage electrical power supply system for a xerographic reproduction device comprising a high voltage transformer having a single primary and a secondary arrangement adapted to provide high voltage direct current outputs of opposing polarities, and a plurality of alternating current generating devices each receiving said same high voltage direct current outputs and each employing light dependent resistors connected to said high voltage outputs and connected in series to different loads, and each having separate light emitting means optically coupled to separate ones of said light dependent reistors with each alternating current generating device having signal generating means for providing a different reference signal to the light emitting means associated therewith, thereby generating an alternating current of a particular selected frequency.

* * * * *